C. W. LEVALLEY.
TRANSMISSION GEARING.
APPLICATION FILED JAN. 10, 1912. RENEWED JAN. 19, 1915.
1,151,022.
Patented Aug. 24, 1915.
2 SHEETS—SHEET 1.
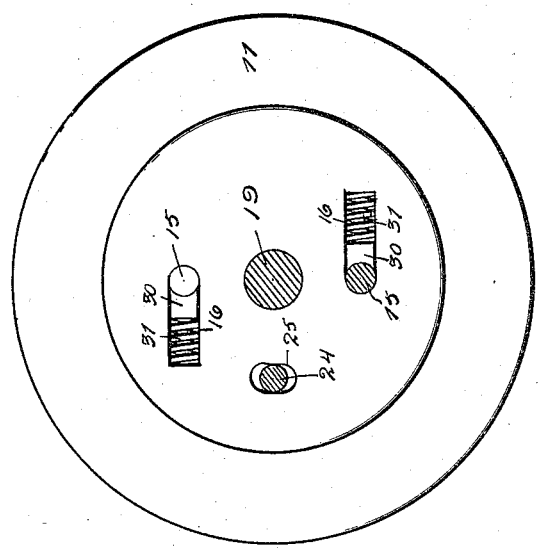
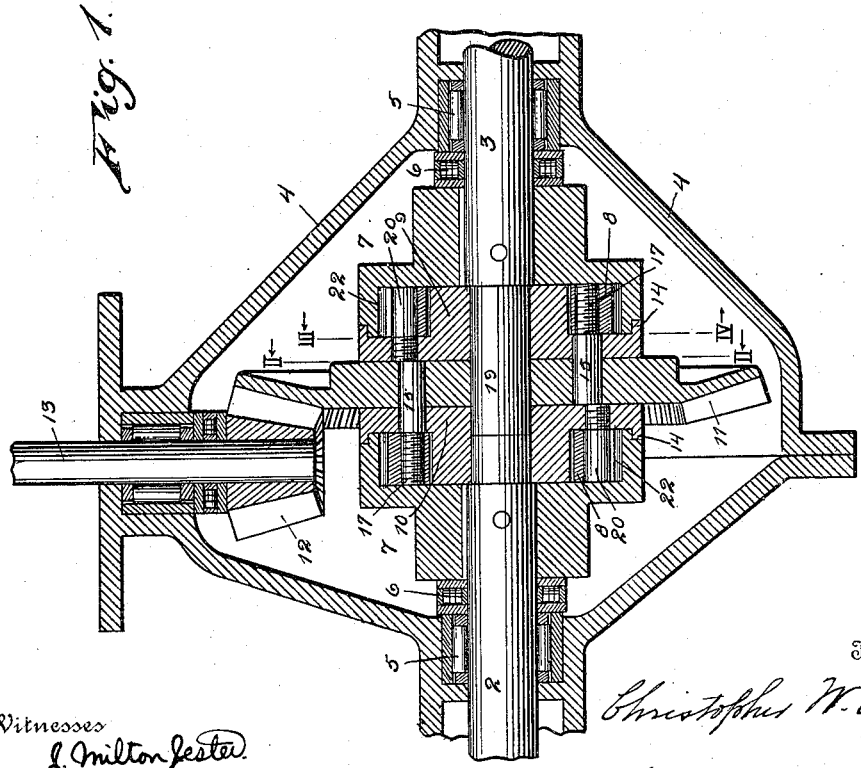

C. W. LEVALLEY.
TRANSMISSION GEARING.
APPLICATION FILED JAN. 10, 1912. RENEWED JAN. 19, 1915.

1,151,022.

Patented Aug. 24, 1915.
2 SHEETS—SHEET 2.

Witnesses
J. Milton Lester
L. C. Braddy

Inventor
Christopher W. Levalley
By John J. Barker
His Attorney

UNITED STATES PATENT OFFICE.

CHRISTOPHER W. LEVALLEY, OF MILWAUKEE, WISCONSIN.

TRANSMISSION-GEARING.

1,151,022.

Specification of Letters Patent.

Patented Aug. 24, 1915.

Application filed January 10, 1912, Serial No. 670,454. Renewed January 19, 1915. Serial No. 3,171.

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Transmission-Gearing, of which the following is a specification.

My invention relates to that class of transmission gearing, interposed between a driving shaft or member and a divided driven shaft or member, in which provision is made for simultaneously turning both sections of the driven shaft with like speed, or, when the shaft sections are turning at different speeds, driving only the more slowly revolving one, which remains in driving connection with the motor, while the other is temporarily disconnected therefrom and free to revolve at a speed greater than that of the section connected with the source of power. Mechanisms of this kind, broadly considered, are well known in the art and have been applied to motor vehicles.

The invention has for its object to improve gearing of this kind, and my improvements are illustrated in the accompanying drawings wherein a practical embodiment of the invention is delineated.

Figure 3:
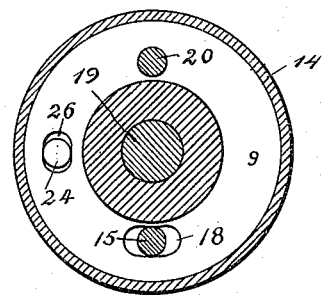
Figure 4:
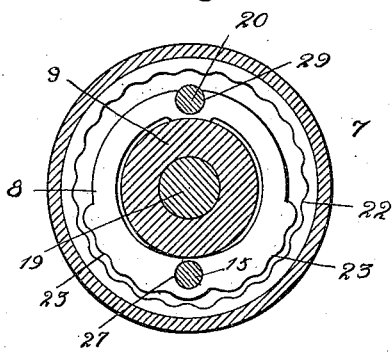
Figure 5:
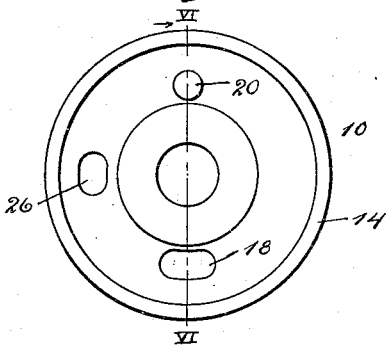
Figure 6:
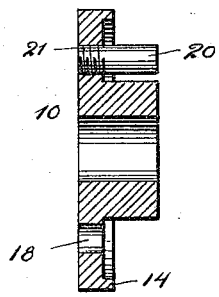
Figure 7:
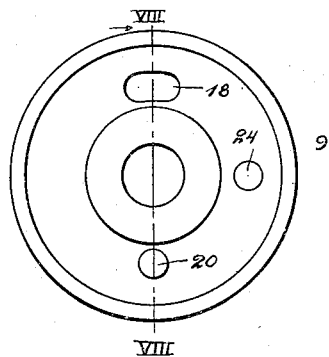
Figure 8:
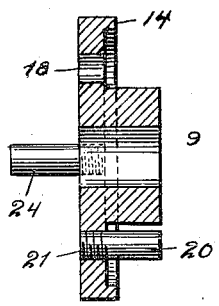

In such drawings—Figure 1 is a horizontal sectional view of a transmission gearing embodying my invention and adapted to be used as part of the driving mechanism of a motor vehicle. Fig. 2 is a transverse sectional view taken on the line II—II of Fig. 1. Fig. 3 is a transverse sectional view taken on the line III—III of Fig. 1. Fig. 4 is a transverse sectional view taken on the line IV—IV of Fig. 1. Fig. 5 is a face view of the disk 10, to be hereinafter described. Fig. 6 is a transverse sectional view taken on the line VI—VI of Fig. 5. Fig. 7 is a face view of the disk 9, to be hereinafter described. Fig. 8 is a transverse sectional view on the line VIII—VIII of Fig. 7.

In the drawings, 2, 3, indicate respectively the sections of a divided driven shaft, which may be the rear axle of an automobile. The inner ends of these shaft sections enter a suitable casing, 4, which is provided with both supporting and thrust bearings for the shaft, designated respectively 5 and 6. The ends of the shaft sections preferably abut and are reduced in diameter, as indicated at
19. To each section of the shaft there is secured, in any suitable manner, a clutch member, 7, of the driving mechanism, which is provided with an inwardly projecting overhanging flange, the inner face of which is corrugated or toothed, as indicated at 22. Within the chamber formed by this flange is mounted the clutch shoe 8, which is preferably of annular form, as represented in Fig. 4, being formed with two exterior corrugated or toothed sections 23, 23, located upon opposite sides of an aperture 27, with which engages that member of the mechanism that controls the movements of the clutch shoe. The shoe is also provided with a bearing seat 29, diametrically opposite the aperture 27, for the pin or fulcrum 20 on which the clutch shoe moves.

As will be seen by reference to Fig. 1, the two clutch members 7 face each other and are quite close together, but not in contact. Arranged between them is a pair of disks, 9, 10, and the driving gear 11, the latter being between the disks; and the hubs of these three parts being preferably loosely supported directly upon the reduced portions 19 of the shaft sections, and occupying the entire space between the hubs of the clutch sections, 7, or between the unreduced parts of the shaft sections, and thus serving to maintain these latter in alinement and proper relation to each other. The disks, 9 and 10, are arranged respectively close against the edges of the overhanging flanges of the clutch members 7 and serve as face or closing plates for the chambers in which are located the clutch shoes 8. The driving gear 11, which, as stated, is between the disks 9 and 10, is represented as being a bevel wheel driven by a bevel pinion 12 upon the motor-driven shaft 13.

I prefer that the overhanging edges of the clutch member 7 and the disks constituting the face plates closing the chambers therein should meet in rabbet joints 14 in order to assist in centering the mechanism and for adding strength to the clutch mechanism.

As may be seen by reference to Fig. 4 of the drawings, the annular clutch shoe 8 occupies the chamber within the overhanging flange of the shaft-connected clutch member 7 and between it and the hub of the disk, 9 or 10. This chamber is large enough to permit the shoe to have the movements necessary for its operation. The latter is supported upon a pin 20, the screw-threaded end 21 of which is seated in an aperture in the adjacent disk, 9 or 10, the fulcrum pin occupying the seat 29 formed therefor in the shoe. An operating pin 15 serves as the member, interposed between the shoe and the drive gear, by which the former is shifted and through which also power is communicated from the drive gear to the clutch mechanism. The pin 15 is provided with a screw-threaded shank or stem 17 that is seated in the aperture 27 in the clutch shoe, preferably diametrically opposite the fulcrum 20. The pin 15 passes transversely through the adjacent disk or face plate in which is formed an elongated slot 18 to accommodate the movements of the pin.

It will be understood that a movement of the drive gear, in either direction, will, through the pin 15, rock the shoe 8 upon its fulcrum 20 until one of its corrugated or toothed sections 23 comes into clutching engagement with the corrugated or toothed face 22 of the clutch member 7, whereupon driving connection is established between the gearing and the shaft to be driven. In order to reduce the shock incident to coupling these parts, I prefer to interpose between the drive gear and the pin 15 a yielding or shock-absorbing connection. This is illustrated in Fig. 2, by reference to which it will be seen that the pin 15 lies in a slot 16 formed in the drive gear 11. Mounted in this slot, and bearing against the pin is a slide block 30 back of which is a stiff coiled spring 31.

One of the disks, that designated 9 in the drawings, though which of them is immaterial, carries a pin 24, supported so as to be parallel with the axis of the driven shaft and extending through a slot 25 formed into the drive gear 11 and into a slot 26 in the opposite disk, 10. The ends of the slot 26 constitute stops or abutments with which the pin 24 engages, as will be described.

The operation of the gearing may now be set forth and understood.

Whenever the two sections of the shaft, 2, 3, are being driven uniformly, as when the vehicle is moving along a straight piece of roadway, power from the shaft 13 is transmitted through the bevel gear, the clutch-shifting and driving pins 15, and the clutch members 8 and 7, to the shaft sections. Should one of these shaft sections be caused to revolve more rapidly than the other, as is the case when the vehicle turns, the section that is turning the more slowly remains in driving connection with the motor, while the one that revolves more rapidly has its driving connection temporarily broken or interrupted, leaving such section free to turn independently both of the motor and the other section of the shaft or axle so long as it revolves the more rapidly. Should its speed become the same as or less than that of the other shaft section it is immediately and automatically again brought into driving connection with the motor. The disengagement of the more rapidly revolving section of the shaft from the motor is effected as follows: the clutch member 7 connected therewith, runs forward, relative to the driving gear 11, carrying with its associated clutch shoe 8 and the driving pin 15, which latter is presently arrested by coming into engagement with the end wall of the slot in which it is seated. Thereupon the clutch shoe is rocked upon its fulcrum 20, since the clutch member 7 continues its relative forward movement, and disengagement is effected between the clutch members 7 and 8, the fast running shaft being now free from connection either with the motor or the other section of the shaft or axle. However, in mechanisms of the kind to which my invention belongs, there is always some friction between the two clutch members, 7 and 8, and this sometimes causes the shoe to move forward beyond its central position of release when one axle section is turning more rapidly than the motor driven section as described, unless provision be made to prevent, and whenever this occurs the clutch shoe will be rocked into position to engage with the shaft-connected clutch member 7, with the result that the two sections of the shaft or axle become connected and operate as though formed of a single unitary piece with well known incident objectionable results. To positively prevent this overrunning of the clutch shoe and the consequent connection of the two sections of the shaft or axle, the pin 24, carried by one of the disks, 9 or 10, and engaging with the other, is employed. When the faster moving shaft section tends to carry forward its clutch shoe and connected disk, as just described, such movement does not progress sufficiently far to tilt the clutch shoe into connecting engagement with the other clutch member before the pin 24 comes into engagement with one of the end walls of the slot 26 in which it lies. When this engagement takes place further forward movement of the loose shoe and the directly connected parts, is arrested or prevented, since one of the elements of engagement—either the pin 24 or the abutment with which it engages, according as one section or the other of the shaft is turning the more rapidly—is connected with the slower moving and motor-connected shaft section which serves to arrest the forward movement of the loose clutch shoe and to positively hold it in a neutral position, that is to say, in one where the shoe and shell are out of working engagement.

While I have illustrated the drive gear 11 as being a bevel wheel, it will be understood that the invention is not limited to a gear of that particular kind, a bevel gear being merely chosen as illustrative of a driving gear located, with reference to the other parts of the mechanism, as shown in the drawings and herein described.

I have in this specification described and illustrated positive clutches between the drive gear 11 and the sections of the driven shaft, and my present invention comprises the specific mechanism constituting the clutch shown. It will be understood, however, that for some purposes of the invention, the positive clutch herein shown and described, is merely illustrative of a clutch device, broadly considered—whether specifically like that shown or mechanically its equivalent.

What I claim is:—

1. In a transmission gearing, the combination of a divided driven shaft, a clutch member carried by each section of the shaft, a drive gear located between the shaft-connected clutch members, annular, oscillating shoes encircling the axis of revolution of the driven shaft and engaging respectively with the clutch members, and means for controlling the movements of the clutch shoes extending respectively from the drive gear to the shoes.

2. In a transmission gearing, the combination of a divided driven shaft, a clutch member carried by each section of the shaft, a drive gear located between the shaft-connected clutch members, annular, oscillating clutch shoes encircling the axis of rotation of the driven shaft, and a pin seated in each clutch shoe substantially diametrically opposite the fulcrum about which it oscillates and engaging with the drive gear, the clutch shoe being formed on either side of the said pin with surfaces arranged to engage with its coöperating shaft-connected member.

3. In a transmission gearing, the combination of a divided driven shaft, a clutch member carried by each section of the shaft, a drive gear located between the shaft-connected clutch members, annular, oscillating clutch shoes encircling the axis of revolution of the driven shaft and engaging respectively with the clutch members, fulcral supports for the clutch shoes loosely supported on the driven shaft, and means for controlling the movements of the clutch shoes extending respectively from the drive gear to the clutch shoes.

4. In a transmission gearing, the combination of a divided driven shaft, a clutch member carried by each section of the shaft, a drive gear located between the shaft-connected clutch members, annular, oscillating clutch shoes encircling the axis of revolution of the drive shaft and engaging respectively with the clutch members, disks loosely supported upon the driven shaft and covering respectively the inner faces of the shaft-connected clutch members, supports carried by the said disks upon which the clutch shoes oscillate, and means for controlling the movements of the clutch shoes extending respectively from the drive gear to the shoes and passing loosely through the said disks.

5. In a transmission gearing, the combination of a divided driven shaft, a clutch member carried by each section of the shaft, having an inwardly extending flange, the inner surface of which is toothed, annular, oscillating clutch shoes encircling the axis of revolution of the driven shaft and located respectively within chambers formed by the said flanges of the shaft-connected clutch members, the said shoe being arranged to engage with the toothed surfaces of the clutch members, disks loosely supported upon the driven shaft and situated respectively between the drive gear and the said clutch members, supports for the clutch shoes about which they oscillate carried by the said disks, and pins for controlling the movements of the clutch shoes connected with the latter at points respectively diametrically opposite the said supports therefor, and extending laterally into position to be engaged by the drive gear.

6. In a transmission gearing, the combination of a divided driven shaft, a clutch member carried by each section of the shaft, a drive gear located between the shaft-connected clutch members, clutch shoes for making positive engagement with the said shaft-connected members, means for controlling the movements of the clutch shoes extending respectively from the shoes to the drive gear, and shock-relieving means interposed between the drive gear, and the said means for controlling the movements of the clutch shoes.

7. In a transmission gearing, the combination of a divided driven shaft, a clutch member carried by each section of the shaft, a driven gear, annular, oscillating clutch shoes encircling the axis of revolution of the driven shaft for engaging with the said clutch members, means for controlling the operations of the clutch shoes extending between them and the drive gear, supports for the said clutch shoes, and means carried by the said supports for maintaining in a released condition a clutch shoe whenever the shaft section with which it is associated revolves faster than the other section.

8. In a transmission gearing, the combination of a divided driven shaft, the ends of the sections being reduced in diameter and in alinement, clutch members fixed to the unreduced portions of the shaft, and provided with inwardly turned flanges, the inner faces of which are formed into clutch surfaces, clutch shoes located within the chambers formed by the said flanges of the clutch members, disks closing the said chambers in the clutch members and having hubs loosely mounted upon the reduced portions of the driven shaft, a central drive gear mounted upon the reduced part of the driven shaft between the hubs of the said disks, pins for controlling the movements of the clutch shoes extending between them and the drive gear, in one of which parts—the clutch shoes or drive gear—they are seated, while with the other one they have engagement, permitting lost motion, the said pins in their course passing loosely through the said disks, and means carried by the said disks for maintaining in a released condition a clutch shoe whenever the shaft section with which it is associated revolves faster than the other section.

9. In a transmission gearing, the combination of a driven shaft, a clutch member carried thereby, a drive gear, an annular oscillating shoe encircling the axis of revolution of the driven shaft and adapted to be moved into engagement with the clutch member carried thereby, and means operated from the driving gear for controlling the movements of the clutch shoe.

CHRISTOPHER W. LEVALLEY.

Witnesses:
JOHN S. BARKER,
GEO. B. PITTS.

Copies of this patent may be obtained for five cents each, by addressing the "Commissioner of Patents, Washington, D. C."

It is hereby certified that in Letters Patent No. 1,151,022, granted August 24, 1915, upon the application of Christopher W. Levalley, of Milwaukee, Wisconsin, for an improvement in "Transmission-Gearing," an error appears in the printed specification requiring correction as follows: Page 3, line 78, claim 5, for the word "shoe" read *shoes;* and that the said Letters Patent should be read with this correction therein that the same may conform to the record of the case in the Patent Office.

Signed and sealed this 8th day of February, A. D., 1916.

[SEAL.]

R. F. WHITEHEAD,
*Acting Commissioner of Patents.*

Cl. 74—7.